United States Patent
Mikura et al.

Patent Number: 5,880,800
Date of Patent: Mar. 9, 1999

[54] OPTICAL FILM AND LIQUID CRYSTAL DISPLAY

[75] Inventors: Chiemi Mikura; Takashi Yamaoka; Akira Wakabayashi, all of Osaka, Japan

[73] Assignee: Nitto Denko Corporation, Osaka, Japan

[21] Appl. No.: 779,362

[22] Filed: Jan. 6, 1997

[30] Foreign Application Priority Data

Jan. 9, 1996 [JP] Japan .................................... 8-019413

[51] Int. Cl.⁶ ..................... G02F 1/1333; G02F 1/1335; B05D 5/10; B52B 7/12
[52] U.S. Cl. ........................... 349/122; 349/96; 349/117; 417/208.4; 428/343; 428/354
[58] Field of Search ............... 349/122, 96, 117; 427/208.4, 207.01; 428/343, 354

[56] References Cited

U.S. PATENT DOCUMENTS

| | | | |
|---|---|---|---|
| 4,025,688 | 5/1977 | Nagy et al. | 349/122 |
| 4,268,127 | 5/1981 | Oshima et al. | 349/122 |
| 4,358,494 | 11/1982 | Akimoto et al. | 427/208.04 |
| 4,387,133 | 6/1983 | Ichikawa et al. | 349/122 |
| 4,436,377 | 3/1984 | Miller | 349/122 |
| 4,731,282 | 3/1988 | Tsukagoshi et al. | 427/207.1 |
| 4,810,523 | 3/1989 | Williams et al. | 427/208.4 |
| 5,464,681 | 11/1995 | Luce | 428/343 |
| 5,667,889 | 9/1997 | Katsura et al. | 428/353 |

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

An optical film comprising an optical base film having one surface or both surface thereof multilayers of pressure-sensitive adhesive layers, wherein the multilayers comprise a combination of pressure-sensitive adhesive layers each having a different stress relaxation time, the pressure-sensitive adhesive layer having the longest stress relaxation time is disposed at the outermost side, and the thickness thereof is 80% or less of the total thickness of the pressure-sensitive layers. The optical film is excellent in heat resistance and moisture resistance, is not difficult to cause foaming and pealing at the interface between a liquid crystal cell and the film even in using at high temperature and high moisture atmosphere, and is suitable for providing a liquid crystal display.

5 Claims, 1 Drawing Sheet

OPTICAL FILM AND LIQUID CRYSTAL DISPLAY

FIELD OF THE INVENTION

The present invention relates to an optical film having a pressure-sensitive adhesive layer, which is excellent in heat resistance and moisture resistance, is difficult to cause foaming and peeling even in a high-temperature and high-humidity atmosphere, and is suitable for the formation of a liquid crystal display.

BACKGROUND OF THE INVENTION

Hitherto, an optical film for liquid crystal display (LCD), which is formed by forming various pressure-sensitive adhesive layers such as an acrylic pressure-sensitive adhesive layer on an optical base film for attaching to a liquid crystal cell, such as a polarizing film, a retardation film, or an elliptically polarizing film formed by laminating these films, has been proposed. Such an optical film is formed by previously forming a pressure-sensitive adhesive layer for attaching to a liquid crystal cell on an optical base film for the purpose of improving the efficiency of LCD assembling and preventing the occurrence of dispersion of quality.

In the optical films for LCD described above, with the increase of the wide use of LCD in various fields as electronic watches, televisions, equipments for loading in cars, etc., and in particular, with the recent increase of the performance and the size of LCD, it has been required that the optical films have the characteristics such as the improved heat resistance and moisture resistance in the state of being mounted on LCD, that is, the characteristics of not causing foaming and peeling even in using in a high-temperature and high-humidity atmosphere such as a heating and moistening treatment, etc.

However, conventional optical films have problems in that these films are poor in heat resistance and moisture resistance, and when they are used in a high-temperature and high-humidity atmosphere, foaming and peeling occur at, for example, the interface between a liquid crystal cell and the optical film to decrease a visual recognition property of the display.

SUMMARY OF THE INVENTION

An object of the present invention is to provide an optical film which is excellent in heat resistance and moisture resistance, is difficult to cause foaming and peeling at, for example, the interface between a liquid crystal cell and the optical film in using in a high-temperature and high-humidity atmosphere, and thus is difficult to decrease a visual recognition property of the display using the optical film.

According to the present invention, there is provided an optical film comprising an optical base film having on one surface or both surfaces thereof multilayers of pressure-sensitive adhesive layers, wherein the multilayers comprise a combination of pressure-sensitive adhesive layers each having a different stress relaxation time, the pressure-sensitive adhesive layer having the longest stress relaxation time is disposed at the outermost position, and the pressure-sensitive layer having the longest stress relaxation time has a thickness of 80% or less of the total thickness of the pressure-sensitive adhesive layers.

By adhering the optical film to a liquid crystal cell via the pressure-sensitive layers having the multilayer structure, a liquid crystal display having a high quality and being excellent in durability, which is excellent in heat resistance and moisture resistance and is difficult to cause foaming and peeling at the adhered interface even in a high-temperature atmosphere, can be obtained.

The mechanism of causing such an excellent merit by forming the multilayer pressure-sensitive adhesive layers has not yet been clarified. This is because, hitherto as described in JP-B-61-34760 (the term "JP-B" as used herein means an "examined published Japanese patent application"), it is considered that for preventing the occurrence of peeling, a pressure-sensitive adhesive layer which has a short stress relaxation time and is liable to relax a stress is useful. Thus the above-described pressure-sensitive adhesive layer is hard to be consistent with a pressure-sensitive adhesive layer having a long stress relaxation time useful for preventing the occurrence of foaming. Therefore, the mechanism of causing the above-described merit based on the above construction of the present invention that the pressure-sensitive adhesive layer having the longest stress relaxation time and being difficult to cause fluid deformation by viscosity is disposed at the outermost position of multilayer pressure-sensitive adhesive layers and this pressure-sensitive adhesive layer is adhered to an adherend such as a liquid crystal cell, etc., is hard to be explained by the above-described conventional consideration.

DETAILED DESCRIPTION OF THE INVENTION

The optical film of the present invention comprises an optical base film having on one surface or both surfaces thereof multilayers of pressure-sensitive adhesive layers, wherein the multilayers comprise a combination of pressure-sensitive adhesive layers each having a different stress relaxation time, and a pressure-sensitive adhesive layer having the longest stress relaxation time is disposed at the outermost position of the multilayers, and this pressure-sensitive adhesive layer has a thickness of 80% or less of the total thickness of the pressure-sensitive adhesive layers.

Figure 1:
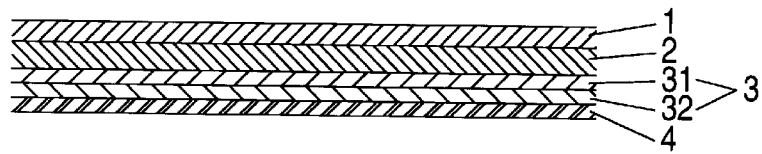
FIG. 1 is a cross-sectional view showing an example of the optical film of the present invention.
Figure 2:
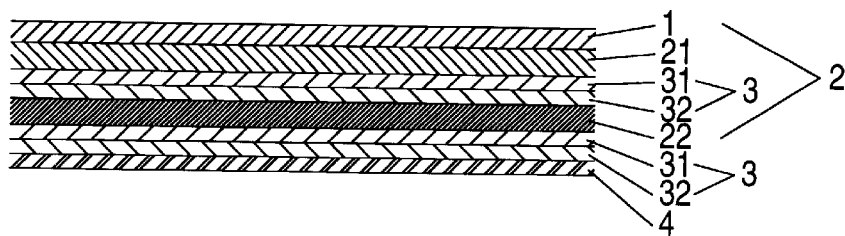
FIG. 2 is a cross-sectional view showing another example of the optical film of the present invention.

Examples of the optical film of the present invention are shown in FIG. 1 and FIG. 2, wherein the numeral 2 shows an optical base film and 3 shows multilayers of pressure-sensitive adhesive layers 31 and 32. Also, in FIG. 2, the numeral 21 shows a polarizing film, 22 shows a retardation film, and elliptically polarizing film as an optical base film 2 is formed by laminating these films via multilayer pressure-sensitive layers 3. In addition, in FIG. 1 and FIG. 2, the numeral 1 shows a protective film and 4 shows a separator.

The optical base film which can be used is a film which is used for liquid crystal displays, etc., such as a polarizing film, a retardation film, an elliptically polarizing film formed by laminating the polarizing film and the retardation film, a reflection-type polarizing film, and an elliptically polarizing film formed by using the reflection-type polarizing film. There is no particular restriction on kind of the optical base film that may be used. In addition, in the case of the laminated layer-type optical base film such as the elliptically polarizing film, the pressure-sensitive adhesive layers in the present invention are preferred as an adhering means used for laminating the layers, from the heat resistance, the moisture resistance, etc.

Examples of the polarizing film are a polarizing film prepared by adsorbing iodine and/or a dichroic dye to a hydrophilic polymeric film such as a polyvinyl alcohol film, a partially formalated polyvinyl alcohol film, an ethylene-vinyl acetate copolymer partially saponificated film, or cellulose film, followed by stretching, and a polyene oriented film such as a dehydration treated product film of polyvinyl alcohol, or a dehydrochloric acid treated product film of polyvinyl chloride. The thickness of the polarizing film is usually from 5 to 80 $\mu$m, but the thickness is not limited to these values.

The reflection-type polarizing film is for forming a liquid crystal display of the type which displays by reflecting incident light from a viewing side (displaying side), and has the merit that a light source such as a back light can be omitted, making it possible to decrease the thickness of the liquid crystal display.

The reflection-type polarizing film can be formed by an appropriate method such as a method of forming a reflecting layer comprising a metal, etc., on one surface of a polarizing film via, if necessary, a transparent resin layer, etc. The above-described transparent resin layer which is, if necessary, formed can be further served as the protective film 1 as shown in FIG. 1 or 2. Accordingly, the above polarizing film may be one having formed on one surface or both surfaces thereof a transparent protective layer.

The specific example of the reflection-type polarizing film is, for example, a film prepared by forming a foil or a vapor-deposited film comprising a reflective metal such as aluminum, on one surface of a transparent resin layer such as a protective film, which is, if necessary, subjected to a matting treatment. Also, there is a film prepared by incorporating fine particles in the above-described transparent resin layer to make the surface a finely uneven structure and forming thereon a reflective layer of a finely uneven structure. The reflective layer is preferably used in the state that the reflecting surface thereof is covered with a transparent resin layer, a polarizing film, or the like, from the point of preventing decrease of the reflectance by oxidation, that is, of long lasting of the initial reflectance, and the point of avoiding additional formation of a protective layer, and the like.

The reflective layer of the finely uneven structure described above has the merits capable of preventing the occurrence of the directivity and glitteringly nice-looking appearance and capable of restraining the occurrence of the unevenness of light and shade, by diffusing incident light by diffused reflection. Also, the transparent resin layer containing the fine particles has the merit capable of restraining the unevenness of light and shade by diffusing incident light and the reflected light thereof in passing through the layer.

The reflective layer of the finely uneven structure which reflects the surface finely uneven structure of the transparent resin layer can be formed by a method of directly forming a metal on the surface of the transparent resin layer by a vapor deposition such as a vacuum vapor deposition, an ion plating, or a sputtering, or an appropriate method such as a plating.

For the formation of the protective film and the transparent protective layer, plastics, etc., excellent in transparency, mechanical strength, heat stability, moisture-shielding property, etc., are preferably used. Examples of the plastics are polyester resins, acetate resins, polyether sulfone resins, polycarbonate resins, polyamide resins, polyimide resins, polyolefin resins, acrylic resins, and acrylic, urethane, acrylurethane, epoxy, and silicone thermosetting or ultra-violet curing resins.

The transparent protective layer may be formed by an appropriate method such as a coating method of a plastic, or a layer lamination method of films. The thickness of the layer may be properly determined, but is generally 5 mm or less, preferably 1 mm or less, and more preferably from 1 to 500 $\mu$m.

The fine particles which are used for the formation of the transparent resin layer of the surface finely uneven structure are inorganic fine particles having, for example, an average particle size of from 0.5 to 5 $\mu$m, such as silica, alumina, titania, zirconia, tin oxide, indium oxide, cadmium oxide, or antimony oxide, and organic fine particles of, for example, a crosslinked or uncrosslinked polymer, which show a transparency in the transparent resin layer. The amount of the fine particles used is generally from 2 to 25 parts by weight, and preferably from 5 to 20 parts by weight, per 100 parts by weight of the transparent resin.

Examples of the retardation film which is the optical film base material are birefringent films obtained by stretching the films of proper plastics such as polycarbonate, polyvinyl alcohol, polystyrene, polymethyl methacrylate, polypropylene, polyolefin, polyacrylate, or polyamide. The retardation film can also be formed by laminating two or more kinds of retardation films to control the optical characteristics such as retardation.

The elliptically polarizing film or the reflection-type elliptically polarizing film, which is the optical base film, is a film obtained by laminating the polarizing film or the reflection-type polarizing film and the retardation film in an appropriate combination, and such an elliptically polarizing film, etc., can also be formed by successively and separately laminating the (reflection-type) polarizing film and the retardation film in the course of the production of a liquid crystal display such that these films form a combination of the (reflection-type) polarizing film and the retardation film. However, the previously formed elliptically polarizing film as described above is excellent in the stability of the quality, the laminating workability, etc., and thus can improve the production efficiency of the liquid crystal displays.

In addition, the optical film-forming layers such as the polarizing film, the retardation film, the protective film, the transparent protective layer, etc., can be imparted with an ultraviolet absorbability by a method of treating the layers with an ultraviolet absorber such as a salicylic acid ester compound, a benzophenol compound, a benzotriazole compound, a cyano acrylate compound, and a nickel complex salt compound.

The pressure-sensitive adhesive layers formed on one surface or both surfaces of the optical base film are formed as laminated layers comprising the combination of pressure-sensitive adhesive layers each having a different stress relaxation time, wherein the pressure-sensitive adhesive layer having the longest stress relaxation time is disposed at the outermost position. The number of the layers can be a proper number such as 2 layers or 3 or more layers. When the pressure-sensitive adhesive layers are multilayers of 3 or more layers, the pressure-sensitive adhesive layer disposed at the outermost position of the optical film is the pressure-sensitive adhesive layer having the longest stress relaxation time.

Where the pressure-sensitive adhesive layers are the multilayers of 3 or more layers, there is no particular restriction on inner layers. For example, a proper multilayer structure such as a multilayer structure that the stress relaxation times of each pressure-sensitive adhesive layers laminated are successively shortened from the longest relaxation time of the outermost pressure-sensitive adhesive layer or a multilayer structure that the pressure-sensitive adhesive layer having the shortest stress relaxation time is used as the intermediate layer in the multilayers, can be used.

The preferred multilayer pressure-sensitive adhesive layers from the points of the heat resistance and the moisture resistance are that based on the stress relaxation time of a pressure-sensitive adhesive layer at 23° C., the stress relaxation time of the outermost pressure-sensitive adhesive layer is at least 100 seconds, preferably from 150 to 1,000 seconds, and more preferably from 200 to 500 seconds, the stress relaxation time of the pressure-sensitive adhesive layer just under the outermost layer is 300 seconds or less, and difference of the stress relaxation time between the outermost pressure-sensitive adhesive layer and the stress relaxation time of the pressure-sensitive adhesive layer just under the outermost layer is at least 50 seconds, and preferably at least 60 seconds.

The thickness of the multilayer pressure-sensitive adhesive layers can be appropriately determined according to the purpose of use and may be over 1 mm. However, from the points of the optical characteristics and the forming workability, the thickness thereof is generally from 3 to 500 μm, preferably from 10 to 100 μm, and more preferably from 15 to 30 μm. In this case, from the points of the heat resistance, the moisture resistance, etc., the ratio of the thickness of the outermost pressure-sensitive adhesive layer to the total thickness of the multilayer pressure-sensitive adhesive layers is 80% or less, preferably ⅔ or less, more preferably ½ or less, and most preferably from ⅒ to ⅖.

In the present invention, the pressure-sensitive adhesive layers are formed as multilayers of pressure-sensitive adhesive layers each having a different stress relaxation time. For the formation of the pressure-sensitive adhesive layers, an appropriate pressure-sensitive adhesive can be used, and there is no particular restriction on the kind of the pressure-sensitive adhesive used. For example, there are rubber pressure-sensitive adhesives, acrylic pressure-sensitive adhesives, silicone pressure-sensitive adhesives, urethane pressure-sensitive adhesives, vinyl alkyl ether pressure-sensitive adhesives, polyvinyl alcohol pressure-sensitive adhesives, polyvinyl pyrrolidone pressure-sensitive adhesives, polyacrylamide pressure-sensitive adhesives, and cellulose pressure-sensitive adhesives. In particular, the acrylic pressure-sensitive adhesives are excellent in the transparency, the weather resistance, the heat resistance, etc., and are preferably used. The pressure-sensitive adhesive layers forming the multilayer structure can comprise an appropriate combination of the same kind or different kinds.

As the acrylic pressure-sensitive adhesives, the conventional materials can be used. In particular, acrylic pressure-sensitive adhesives using, as the base polymers, acrylic polymers using 1 or more kinds of acrylic acid alkyl esters comprising acrylic acid or methacrylic acid esters having a straight chain or branched alkyl group having 4 to 18 carbon atoms, such as n-butyl, t-butyl, isobutyl, amyl, isoamyl, hexyl, heptyl, cyclohexyl, 2-ethylhexyl, octyl, isooctyl, nonyl, isononyl, decyl, undecyl, lauryl, tridecyl, tetradecyl, stearyl, and octadecyl are preferred from the points of the pressure-sensitive adhesive characteristics, etc.

The weight average molecular weight of the acrylic polymers is preferably at least 300,000, and more preferably from 300,000 to 1,500,000, from the point of the pressure-sensitive adhesive characteristics. The acrylic polymer may be, if necessary, copolymerized with 1 or more kinds of other appropriate monomer component than the above-described acrylic acid alkyl ester according to the modification purpose for improving the adhesive property by the introduction of a functional group or a polar group, improving the cohesive force and the heat resistance by controlling the glass transition temperature of the formed copolymer, modifying the pressure-sensitive adhesive characteristics such as the increase of the molecular weight, etc., by imparting a crosslinking reactivity, etc. Accordingly, there is no particular restriction on the monomer component for copolymerization used, and any monomer component copolymerizable with the acrylic acid alkyl ester may be used. The amount thereof used is preferably 50% by weight or less, and more preferably 40% by weight or less, based on the weight of the total monomers.

Examples of the monomer component are carboxy group-containing monomers such as acrylic acid, methacrylic acid, carboxyethyl acrylate, carboxypentyl acrylate, itaconic acid, maleic acid, fumaric acid, crotonic acid, etc., and acid anhydride monomers such as maleic anhydride, itaconic anhydride, etc. The amount thereof used is preferably 20 parts by weight or less per 100 parts by weight of the acrylic acid alkyl ester from the points of the pressure-sensitive adhesive characteristics, etc.

Also, there are hydroxy group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)methyl acrylate, etc.; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, (meth)acryloyloxynaphthalenesulfonic acid, etc,; and phosphoric acid group-containing monomers such as 2-hydroxyethylacryloyl phosphate, etc., as the examples of the monomer component for the modification.

Furthermore, there are (N-substituted)amide monomers such as (meth)acrylamide, N,N-dimethyl (meth)acrylamide, N-butyl (meth)acrylamide, N-methylol (meth)acrylamide, N-methylolpropane (meth)acrylamide, etc.; alkylaminoalkyl (meth)acrylate monomers such as aminoethyl (meth)acrylate, N,N-dimethylaminoethyl (meth)acrylate, t-butylaminoethyl (meth)acrylate, etc.; alkoxyalkyl (meth)acrylate monomers such as methoxyethyl (meth)acrylate, ethoxyethyl (meth)acrylate, etc.; maleimide monomers such as N-cyclohexyl-maleimide, N-isopropylmaleimide, N-phenylmaleimide, etc.; itaconimide monomers such as N-methylitaconimide, N-ethylitaconimide, N-butylitaconimide, N-octylitaconimide, N-2-ethylhexylitaconimide, N-cyclohexylitaconimide, N-laurylitaconimide, etc.; and succinimide monomers such as N-(meth)acryloyl-6-oxyhexamethylenesuccinimide, N-(meth)acryloyl-8-oxyoctamethylenesuccinimide, etc.; as examples of the monomer component for the modification.

Moreover, alkyl acryl ester monomers having a lower alkyl group such as ethyl, n-propyl, isopropyl, etc.; vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam, etc.; cyano acrylate monomers such as acrylonitrile, methacrylonitrile, etc.; epoxy group-containing acrylic monomers such as glycidyl (meth)acrylate, etc.; glycol acryl ester monomers such as polyethylene glycol (meth)acrylate, polypropylene glycol (meth)acrylate, methoxyethylene glycol (meth)acrylate, etc.; and acrylic acid ester monomers such as tetrahydrofurfuryl (meth)acrylate, 2-methoxyethyl acrylate, etc., are also examples of the monomer component for the modification.

The amount of the monomer component used for the modification is preferably 50 parts by weight or less per 100 parts by weight of the acrylic acid alkyl ester from the points of the pressure-sensitive adhesive characteristics, etc.

On the other hand, a polyfunctional acrylate monomer, etc., can be used, if necessary, as the monomer component for the copolymerization. The use of such a polyfunctional acrylate monomer makes it possible to apply a crosslinking treatment without the addition of a crosslinking agent by a post crosslinking operation, etc., by the irradiation of radiations such as electron rays, etc.

Examples of the polyfunctional acrylate monomer are hexanediol (meth)acrylate, (poly)ethylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri (meth)acrylate, dipentaerythritol hexa(meth)acrylate, epoxy acrylate, polyester acrylate, and urethane acrylate. The polyfunctional acrylate monomers can be used alone or as a mixture of 2 or more kinds thereof. The amount thereof used is preferably 30% by weight or less based on the weight of the total monomers from the points of the pressure-sensitive adhesive characteristics, the maintenance of the characteristics of the acrylic polymer, etc.

The acrylic polymer can be prepared by applying an appropriate method such as a solution polymerization method, an emulsion polymerization, a bulk polymerization method, a suspension polymerization method, etc., to 1 kind of the monomer described above or a mixture of 2 or more kinds of the monomers. In the case of the bulk polymerization method, the polymerization method by the irradiation of ultraviolet rays can be preferably applied. The weight average molecular weight of the acrylic polymer which can be preferably used in the present invention is at least 100,000, preferably at least 200,000, and more preferably from 400, 000 to 2,000,000, from the points of the heat resistance, the moisture resistance, etc.

In preparing the acrylic polymer, if necessary, a polymerization initiator may be used. The amount thereof used can be appropriately determined, but is generally from 0.001 to 5% by weight based on the total weight of the monomers. As the polymerization initiator, an appropriate initiator such as a thermal polymerization initiator, a photopolymerization initiator, etc., can be used according to the polymerization method thereof, such as a radical polymerization, etc.

Examples of the thermal polymerization initiator are organic peroxides such as benzoyl peroxide, t-butyl perbenzoate, cumene peroxide, isopropylperoxy dicarbonate, di-n-propylperoxy dicarbonate, di(2-ethoxyethyl)peroxy dicarbonate, t-butylperoxy neodecanate, t-butylperoxy pivalate, diacetyl peroxide, etc.

Also, azo compounds such as 2,2'-azobisisobutyronitrile, 2,2'-azobis(2-methylbutyronitrile), 1,1'-azobis (cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile), 2,2'-azobis[2-(2-imidazolin-2-yl)propane], etc., are used as the thermal polymerization initiator.

On the other hand, examples of the photopolymerization initiator are acetophenone initiators such as 4-(2-hydroxyethoxy)phenyl(2-hydroxy-2-propyl) ketone, α-hydroxyα,α'-dimethylacetophenone, ethoxyacetophenone, 2,2-dimethoxy-2-phenylacetophenone, 2,2-diethoxyacetophenone, 1-hydroxycyclohexyl phenyl ketone, 2-methyl-1-[4-(methylthio)phenyl]-2-morpholinoporpane-1, etc., and benzoin ether initiators such as benzoin ethyl ether, benzoin propyl ether, anizoin methyl ether, etc.

Also, α-ketol compounds such as 2-methyl-2-hydroxypropiophenone, etc.; ketal compounds such as benzylmethylketal, etc.; aromatic sulfonyl chloride compounds such as 2-naphthalenesulfonyl chloride, etc.; photoactive oxime compounds such as 1-phenone-1,1-propanedione-2-(o-ethoxycarbonyl)oxime, etc.; benzophenone compounds such as benzoyl benzoate, 3,3'-dimethyl-4-methoxybenzophenone, etc.; thioxanethone compounds such as thioxanthone, 2-chlorothioxanethone, 2-methylthioxanthone, 2,4-dimethylthioxanthone, isopropylthioxanthone, 2,4-dichloro-thioxanthone, 2,4-diethylthioxanthone, 2,4-diisopropyl-thioxanthone, etc.; and also camphorquinone, halogenated ketones, acylphosphonoxide, acyl phosphonate, etc., are used as the photopolymerization initiator.

Examples of other polymerization initiators are potassium persulfate, ammonium persulfate, hydrogen peroxide, and redox initiators using these compounds and a reducing agent.

As described above, in the present invention, the pressure-sensitive adhesive layers can be subjected to a crosslinking treatment by an appropriate method such as an internal crosslinking method, an external crosslinking method, etc. The internally crosslinked acrylic polymer can be prepared by applying, for example, a radical polymerization method by the thermal polymerization initiator using the polyfunctional monomer component, a radiation polymerization method by the photopolymerization initiator. On the other hand, the external crosslinking can be carried out by a method of compounding an intermolecular crosslinking agent in a pressure-sensitive adhesive, a method of irradiating the pressure-sensitive adhesive layers with radiations, etc. Even in the case of the external crosslinking method, the crosslinking efficiency can be improved by copolymerizing a polyfunctional monomer component in the acrylic polymer.

As the intermolecular crosslinking agent, a proper crosslinking agent can be used according to the kind, etc., of the functional group in the base polymer such as the acrylic polymer, etc., which takes part in the intermolecular crosslinking, and there is no particular restriction on the intermolecular crosslinking agent. Thus, conventional intermolecular crosslinking agents may be used. Examples thereof are polyfunctional isocyanate crosslinking agents such as tolylene diisocyanate , trimethylolpropanetolylene diisocyanate, diphenylmethane triisocyanate, etc.; epoxy crosslinking agents such as polyethylene glycol diglycidyl ether, diglycidyl ether, trimethylolpropane triglycidyl ether, etc.; melamine resin crosslinking agents; metal chelate crosslinking agents; amino resin crosslinking agents; peroxide crosslinking agents, etc.

The amount of the intermolecular crosslinking agent used can be appropriately decided according to the crosslinking efficiency, the pressure-sensitive adhesive characteristics, etc., and there is no particular restriction on the amount. However, the amount thereof is generally 20% by weight or less, preferably 15% by weight or less, and more preferably from 0.5 to 10% by weight, based on the weight of the base polymer.

The pressure-sensitive adhesive layers in the present invention can be, if necessary, compounded with various kinds of additives, which are usually used for pressure-sensitive adhesives, such as natural or synthetic resins, tackifiers, plasticizers, softeners, glass fibers, glass beads, metal powders, fillers comprising inorganic powders such as calcium carbonate, clay, etc., pigments, coloring agents, antioxidants, etc. Also, fine particles can be incorporated in the pressure-sensitive adhesive layer to provide the pressure-sensitive adhesive layer showing a light diffusion property. In these additives, the tackifier is useful for improving the adhesive force. An appropriate conventional tackifier can be used as the tackifier.

In the case of maintaining the adhesive force at room temperature and improving the low-temperature adhesive force described above, the use of the plasticizer or the softener is also useful. As the plasticizer and the softener, appropriate and conventional ones can be used. In particular, the plasticizer and the softener showing less volatilization and having a high-boiling point are preferably used. Examples of the plasticizers and the softeners are phthalic acid compounds such as dimethyl phthalate, diethyl phthalate, dibutyl phthalate, diheptyl phthalate, di-2-ethylhexyl phthalate, diisononyl phthalate, diisodecyl phthalate, dibutylbenzyl phthalate, dioctyl phthalate, butylphthalylbutyl glycolate, etc., and trimellitic acid compounds such as tributyl trimellitate, tri-2-ethylhexyl trimellitate, tri-n-octyl trimellitate, triisodecyl trimellitate, etc.

Also, aliphatic dibasic acid ester compounds such as dibutyl fumarate, dibutyl maleate, di-2-ethylhexyl maleate, diisobutyl adipate, diisononyl adipate, diisodecyl adipate, dibutoxyethyl adipate, dibutyl sebacate, di-2-ethylhexyl sebacate, etc.; phosphoric acid ester compounds such as triethyl phosphate, triphenyl phosphate, tricresyl phosphate, trixylenyl phosphate, cresylphenyl phosphate, etc.; epoxy compounds such as diisodecyl-4.5%-epoxytetrahydro phthalate, etc.; butyl oleate; chlorinated paraffin; polybutene; polyisobutylene; etc., are the examples of the plasticizers and the softeners.

The pressure-sensitive adhesive layers can be formed on one surface or both surfaces of the optical base film by an appropriate method. Examples of the method are a method of preparing a pressure-sensitive adhesive liquid containing from about 10 to 40% by weight of solid components as a solution in an appropriate organic solvent such as toluene, ethyl acetate, etc., or a dispersion or emulsion with water and directly forming the pressure-sensitive adhesive liquid on the optical base film by an appropriate developing method such as a casting method, a coating method, etc., a method of coating a pressure-sensitive adhesive as a mixture of the monomer components on the optical base film and irradiating the coated layer with radiations, and a method of transferring a pressure-sensitive adhesive layer formed on a separator by the method described above onto the optical base film. Accordingly, multilayers of the pressure-sensitive adhesive layers can be formed by an appropriate method such as a wet-on-wet coating method or a transferred laminating method.

In carrying out the polymerization treatment of the coated layers of the pressure-sensitive adhesive by the irradiation of radiations, it is preferred to carry out the polymerization in an atmosphere replaced with an inert gas such as a nitrogen gas, etc., or in an air-shielded state such as the covered state with a light-transmitting film, from the point of obtaining the desired pressure-sensitive adhesive characteristics. Also, a coatable syrupy liquid of the monomer component(s) having a viscosity of from about 500 to 5,000 c.p. is prepared by subjecting the monomer component to a prepolymerization treatment or by adding a thixotropic agent such as fumed silica to a mixture of the monomer component and the photopolymerization initiator, the syrupy liquid is coated on the optical base film or the separator, and the coated layer is irradiated by radiations again, whereby the desired pressure-sensitive adhesive layer can be formed. In this case, the photopolymerization initiator may be added by separating 2 or more parts.

In addition, in irradiating the coated layer with ultraviolet rays, the ultraviolet rays having a wavelength range of from 180 to 460 nm are preferable in the point of the treatment efficiency, etc. As the source of emitting the ultraviolet rays, an appropriate irradiation device such as a mercury arc, a carbon arc, a (low- pressure, intermediate-pressure, or high-pressure) mercury lamp, and a metal halide lamp can be used. The irradiation dosage can be appropriately determined according to the polymerization circumstance, etc., but is usually from about 400 to 3,000 mj/cm$^2$.

The control of the stress relaxation time of the pressure-sensitive adhesive layer can be performed by an appropriate method such as the control of the glass transition temperature, the control of the molecular weight, and the control of the crosslinked density by controlling the amount of a crosslinking agent used. In addition, in forming the multilayer pressure-sensitive adhesive layers on both the surfaces of the optical base film, the compositions, the kinds, etc., of the pressure-sensitive adhesive layers can be varied between the front surface and the back surface of the optical base film.

When the pressure-sensitive layer is exposed at the surface thereof, it is preferred to protect the surface the layer with a separator, etc., before practical use. In addition, at the formation of the pressure-sensitive adhesive layers on the surface(s) of the optical base film, an undercoat may be formed on the surface(s) of the optical base film for improving the adhesion of the pressure-sensitive adhesive layer.

Furthermore, in the formation of the optical film of the present invention, it is preferred to use the material similar to the pressure-sensitive adhesive layers formed on the optical base film as the material for laminating various kinds of films such as the protective film, etc., from the points of the moisture resistance, the heat resistance, etc.

The optical film of the present invention can be used for an appropriate use such as the formation of a liquid crystal display. The formation of the liquid crystal display can be carried out by adhering the optical film of the present invention on one side or both sides of a liquid crystal cell via the pressure-sensitive adhesive layers thereof. Adhering of the optical film to the liquid crystal cell is performed such that the polarizing film, the retardation film, etc., thereof are disposed at the definite positions and the disposed positions of them can follow the conventional positions. The optical film of the present invention is particularly preferably used for a liquid crystal cell using a glass plate.

Figure 3:
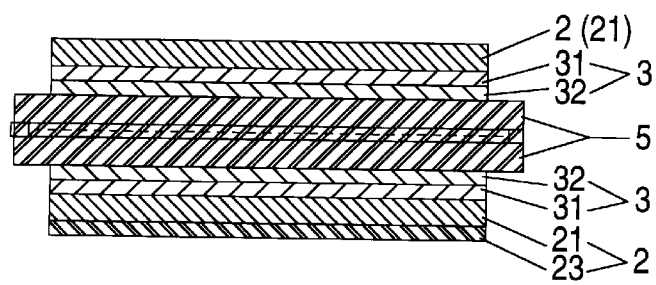
FIG. 3 is a cross-sectional view showing an example of the liquid crystal display of the present invention.
Figure 4:
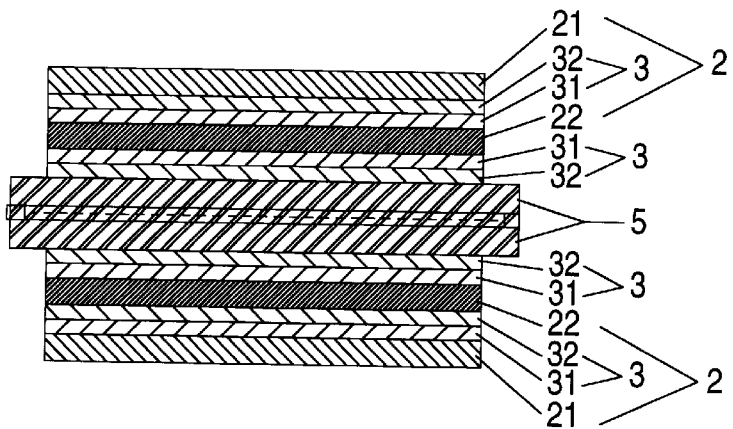
FIG. 4 is a cross-sectional view showing another example of the liquid crystal display of the present invention.

In this connection, examples of disposing the optical film of the present invention in liquid crystal displays are shown in FIG. 3 and FIG. 4, wherein the numeral 5 shows a liquid crystal cell and other numerals are the same as in FIG. 1 and FIG. 2. In addition, the liquid crystal display shown in FIG. 3 is a reflection-type display, wherein a reflecting layer 23 is formed on a polarizing film 21, that is, the reflecting layer 23 is disposed at the outer side of the one side of the liquid crystal cell. Also, the liquid crystal display shown in FIG. 4 uses retardation films 22. The retardation film is used for compensating the retardation of the liquid crystal cell for the purposes of preventing coloring and expanding the visible range. In this case, the retardation film can be used as an elliptically polarizing film formed by laminating with a polarizing film.

The optical film of the present invention has a flexibility and is easily applied to a curved surface and a surface of a large area. Thus, the optical film of the present invention can form various kinds of liquid crystal displays by applying to liquid crystal cells of proper types, such as optional liquid crystal cells, for example, an active matrix drive-type liquid crystal cell such as a thin-film transistor-type liquid crystal cell and a simple matrix drive-type liquid crystal cell such as a twist nematic type-liquid crystal cell and a super twist nematic type-liquid crystal cell.

The present invention is described in more detail by reference to the following Reference Examples, Examples and Comparative Examples, but it should be understood that the invention is not construed as being limited thereto. Unless otherwise indicated, all percents, parts, ratios and the like are by weight.

REFERENCE EXAMPLE 1

In a reaction vessel equipped with a condenser, a nitrogen gas inlet pipe, a thermometer, and a stirrer were placed 95 parts of butyl acrylate, 5 parts of acrylic acid, and 0.3 part of 2,2'-azobisisobutyronitrile together with 120 parts of ethyl acetate. After carrying out the reaction at 60° C. for 4 hours and then at 80° C. for 2 hours under a nitrogen gas stream, ethyl acetate was added to the reaction liquid to obtain a solution of an acrylic copolymer (conversion: 99%, weight average molecular weight: 800,000) having a solid component concentration of 40% by weight. The solution was compounded with 0.5 part of trimethylolpropane-tolylene diisocyanate per 100 parts of the acrylic polymer to obtain an acrylic pressure-sensitive adhesive. The pressure-sensitive adhesive was coated on a separator composed of a polyester film surface-treated with a silicone series releasing agent followed by heat-treated for 5 minutes at 150° C. to provide a pressure-sensitive adhesive layer.

The stress relaxation time of the pressure-sensitive adhesive layer composed of the above acrylic pressure-sensitive adhesive was 230 seconds. In addition, the stress relaxation time is the following time. That is, a pressure-sensitive adhesive layer sample having a cross-sectional area of 5 mm$^2$ and a length of 30 mm is formed, the sample is stretched at room temperature (23° C.) under the conditions of a chuck distance of 10 mm, a tensile speed of 300 mm/minute, and a tensile distance of 100%, and the time at which the tensile stress decreases to 1/e of the maximum stress is the stress relaxation time (hereinafter the same).

REFERENCE EXAMPLE 2

The same procedure as in Reference Example 1 was followed except that the compounding amount of trimethylolpropanetolylene diisocyanate was changed to 2.0 parts, to obtain an acrylic pressure-sensitive adhesive. A pressure-sensitive adhesive layer was formed on a separator in the same manner as in Reference Example 1. The stress relaxation time of the pressure-sensitive adhesive layer was 360 seconds.

REFERENCE EXAMPLE 3

The same procedure as in Reference Example 1 was followed using 57 parts of butyl acrylate, 40 parts of 2-ethylhexyl acrylate, and 3 parts of acrylic acid, to obtain a solution of an acrylic copolymer (conversion: 99%, weight average molecular weight 400,000) having a solid component concentration of 40% by weight. The solution was compounded with 1.0 part of trimethylolpropanetolylene diisocyanate per 100 parts of the acrylic copolymer, and a pressure-sensitive adhesive layer was formed on a separator using the copolymer. The stress relaxation time of the pressure-sensitive adhesive layer was 68 seconds.

REFERENCE EXAMPLE 4

The same procedure as in Reference Example 1 was followed using the same monomer composition while changing the polymerization condition, to obtain a solution of an acrylic copolymer having a weight average molecular weight of 1,100,000. The solution was compounded with 1.0 part of trimethylolpropanetolylene diisocyanate per 100 parts of the acrylic copolymer, and a pressure-sensitive adhesive layer was formed on a separator using the copolymer. The stress relaxation time of the pressure-sensitive adhesive layer was 420 seconds.

Example 1

A pressure-sensitive adhesive layer having a thickness of 15 μm obtained by following the same procedure as in Reference Example 1 was transferred onto the surface of a polarizing film (NPF-G5220DU, trade name, made by Nitto Denko Corporation). A pressure-sensitive adhesive layer having a thickness of 10 μm obtained by following the same procedure as in Reference Example 2 was transferred and laminated on the pressure-sensitive adhesive layer thus transferred to obtain an optical film.

EXAMPLE 2

A pressure-sensitive adhesive layer having a thickness of 10 μm obtained by following the same procedure as in Reference Example 3 was transferred onto the surface of the same polarizing film as used in Example 1. A pressure-sensitive adhesive layer having a thickness of 10 μm obtained by following the same procedure as in Reference Example 2 was transferred and laminated on the pressure-sensitive adhesive layer thus transferred to obtain an optical film.

EXAMPLE 3

A pressure-sensitive adhesive layer having a thickness of 10 μm obtained by following the same procedure as in Reference Example 2 was transferred onto the surface of the same polarizing film as used in Example 1. A pressure-sensitive adhesive layer having a thickness of 10 μm obtained by following the same procedure as in Reference Example 1 was transferred onto the pressure-sensitive adhesive layer thus transferred, and further a pressure-sensitive adhesive layer having a thickness of 10 μm obtained by following the same procedure as in Reference Example 2 was transferred onto the pressure-sensitive adhesive layer thus transferred, to obtain an optical film having the pressure-sensitive adhesive layer of a 3 layer structure.

EXAMPLE 4

A pressure-sensitive adhesive layer having a thickness of 20 μm obtained by following the same procedure as in Reference Example 1 was transferred onto the surface of the same polarizing film as used in Example 1. A pressure-sensitive adhesive layer having a thickness of 5 μm obtained by following the same procedure as in Reference Example 2 was transferred onto the pressure-sensitive adhesive layer thus transferred, to obtain an optical film.

EXAMPLE 5

A pressure-sensitive adhesive layer having a thickness of 18 μm obtained by following the same procedure as in Reference Example 1 was transferred onto the surface of the same polarizing film as used in Example 1. A pressure-sensitive adhesive layer having a thickness of 5 μm obtained by following the same procedure as in Reference Example 4 was transferred onto the pressure-sensitive adhesive layer thus transferred, to obtain an optical film.

COMPARATIVE EXAMPLE 1

A pressure-sensitive adhesive layer having a thickness of 25 μm obtained by following the same procedure as in Reference Example1 was transferred onto the surface of the same polarizing film as used in Example1 to obtain an optical film.

COMPARATIVE EXAMPLE 2

A pressure-sensitive adhesive layer having a thickness of 25 μm obtained by following the same procedure as in Reference Example 2 was transferred onto the surface of the same polarizing film as used in Example1 to obtain an optical film.

COMPARATIVE EXAMPLE 3

A pressure-sensitive adhesive layer having a thickness of 25 μm obtained by following the same procedure as in Reference Example 3 was transferred onto the surface of the same polarizing film as used in Example1 to obtain an optical film.

COMPARATIVE EXAMPLE 4

A pressure-sensitive adhesive layer having a thickness of 3 μm obtained by following the same procedure as in Reference Example1 was transferred onto the surface of the same polarizing film as used in Example 1. A pressure-sensitive adhesive layer having a thickness of 22 μm obtained by following the same procedure as in Reference Example 2 was transferred onto the pressure-sensitive adhesive layer thus transferred to obtain an optical film.

Evaluation Test

Heat Resistance:

Each of the optical films obtained in the examples and the comparative examples was press-adhered to a glass plate having a thickness of 1.3 mm via each pressure-sensitive adhesive layer under the condition of 50° C. and 3 kg/cm². After heating the assembly in an atmosphere of 90° C. for 500 hours, the presence and absence of foaming and peeling were visually observed. In this case, the sample of showing neither foaming nor peeling was evaluated as excellent (o), the sample showing foaming was evaluated as bad (x), and the sample that foaming gave bad influence to visual recognition property was evaluated as worst (xx). In addition, peeling was not observed in each sample.

Moisture Resistance:

Each of the optical films obtained in the examples and the comparative examples was press-adhered to a glass plate having a thickness of 1.3 mm via each pressure-sensitive adhesive layer. After heating the assembly in an atmosphere of 50° C. and 90% R.H. for 1,000 hours, the presence and the absence of peeling were visually observed. In this case, the sample showing no peeling was evaluated as excellent (o) and the sample showing peeling was evaluated as bad (x). In addition, foaming was not observed in each sample.

The results obtained are shown in the following table.

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Heat Resistance | o | o | o | o | o | xx | o | xx | x |
| Moisture Resistance | o | o | o | o | o | x | x | x | x |

In the above table;

o: Excellent x: Bad xx: Worst

While the invention has been described in detail and with reference to specific embodiments thereof, it will be apparent to one skilled in the art that various changes and modifications can be made therein without departing from the spirit and scope thereof.

What is claimed is:

1. An optical film comprising an optical base film having on one surface or both surfaces thereof multilayers of pressure-sensitive adhesive layers, wherein the multilayers comprise a combination of pressure-sensitive adhesive layers each having a different stress relaxation time, the pressure-sensitive adhesive layer having the longest stress relaxation time is disposed at the outermost position, and a thickness of said pressure-sensitive adhesive layer having the longest relaxation time is 80% or less of the total thickness of the pressure-sensitive adhesive layers.

2. The optical film of claim 1, wherein the stress relaxation time of the pressure-sensitive adhesive layers at 23° C. is at least 100 seconds in the outermost pressure-sensitive adhesive layer and 300 seconds or less in the pressure-sensitive adhesive layer under the outermost layer, and the difference between the stress relaxation time of the outermost layer and that of the layer under the outermost layer is at least 50 seconds.

3. The optical film of claim 1, wherein the optical base film is a polarizing film, a reflection-type polarizing film, or a retardation film.

4. The optical film of claim 1, wherein the optical base film is an elliptically polarizing film obtained by laminating a polarizing film and a retardation film via a pressure-sensitive adhesive layer or a reflection-type elliptically polarizing film obtained by laminating a reflection-type polarizing film and a retardation film via a pressure-sensitive adhesive layer.

5. A liquid crystal display comprising a liquid crystal cell having adhered to one side or both sides thereof at least one of the optical film as claimed in claim 1.

* * * * *